(12) United States Patent
Yao et al.

(10) Patent No.: US 10,801,447 B2
(45) Date of Patent: Oct. 13, 2020

(54) LOW-TEMPERATURE FUEL REFORMING UNIT BASED ON COMBINED EXTERNAL REFORMER OF AN ENGINE

(71) Applicant: Tianjin University, Tianjin (CN)

(72) Inventors: Mingfa Yao, Tianjin (CN); Yang Wang, Tianjin (CN); Lixia Wei, Tianjin (CN); Haifeng Liu, Tianjin (CN); Hu Wang, Tianjin (CN); Zunqing Zheng, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/559,822

(22) PCT Filed: Mar. 27, 2017

(86) PCT No.: PCT/CN2017/078283
§ 371 (c)(1),
(2) Date: Sep. 19, 2017

(87) PCT Pub. No.: WO2018/126540
PCT Pub. Date: Jul. 12, 2018

(65) Prior Publication Data
US 2019/0345902 A1 Nov. 14, 2019

(30) Foreign Application Priority Data
Jan. 6, 2017 (CN) .......................... 2017 1 0012200

(51) Int. Cl.
*F02M 31/02* (2019.01)
*F02M 27/00* (2006.01)
*F02M 31/16* (2006.01)

(52) U.S. Cl.
CPC ............ *F02M 27/00* (2013.01); *F02M 31/16* (2013.01)

(58) Field of Classification Search
CPC ....... F02M 27/00; F02M 31/16; Y02T 10/126
(Continued)

(56) References Cited

U.S. PATENT DOCUMENTS

2008/0230018 A1* 9/2008 Kobayashi ............. F02M 27/02
123/3

FOREIGN PATENT DOCUMENTS

EP 1845246 A1 * 10/2007 ............. C01B 3/386

* cited by examiner

*Primary Examiner* — Hai H Huynh
(74) *Attorney, Agent, or Firm* — George G. Wang

(57) ABSTRACT

The present invention discloses a novel low-temperature fuel reforming unit based on combined external reformer of an engine, comprising an engine cylinder and an external low-temperature fuel reformer; the external low-temperature fuel reformer is winded with a heater strip and is provided with a first temperature controlled meter, the inlet of the external low-temperature fuel reformer is connected with a air inlet pipe and a fuel sample injection pipe, and a flow meter is arranged on the air inlet pipe; the fuel sample injection pipe is connected with a fuel injection pump and a fuel vaporization tank which is provided with a second temperature controlled meter; the outlet of the external low-temperature fuel reformer is connected with the engine inlet pipe via a reforming gas pipe; and the reformed low-temperature products enter into the engine inlet pipe via the reforming gas pipe for combining with the fresh air again to form a uniform hybrid gas, and the hybrid gas is introduced into the engine cylinder and performing combined combustion with the fuel in the cylinder to achieve activity and concentration stratification of hybrid gas. Since the above process does not need adding catalyst, the engine of the present invention can be operated more efficient and energy-saving.

1 Claim, 1 Drawing Sheet

(58) Field of Classification Search
USPC ... 123/3, 527, 536, 538, 539, 543, 545, 549, 123/554, 557, 556
See application file for complete search history.

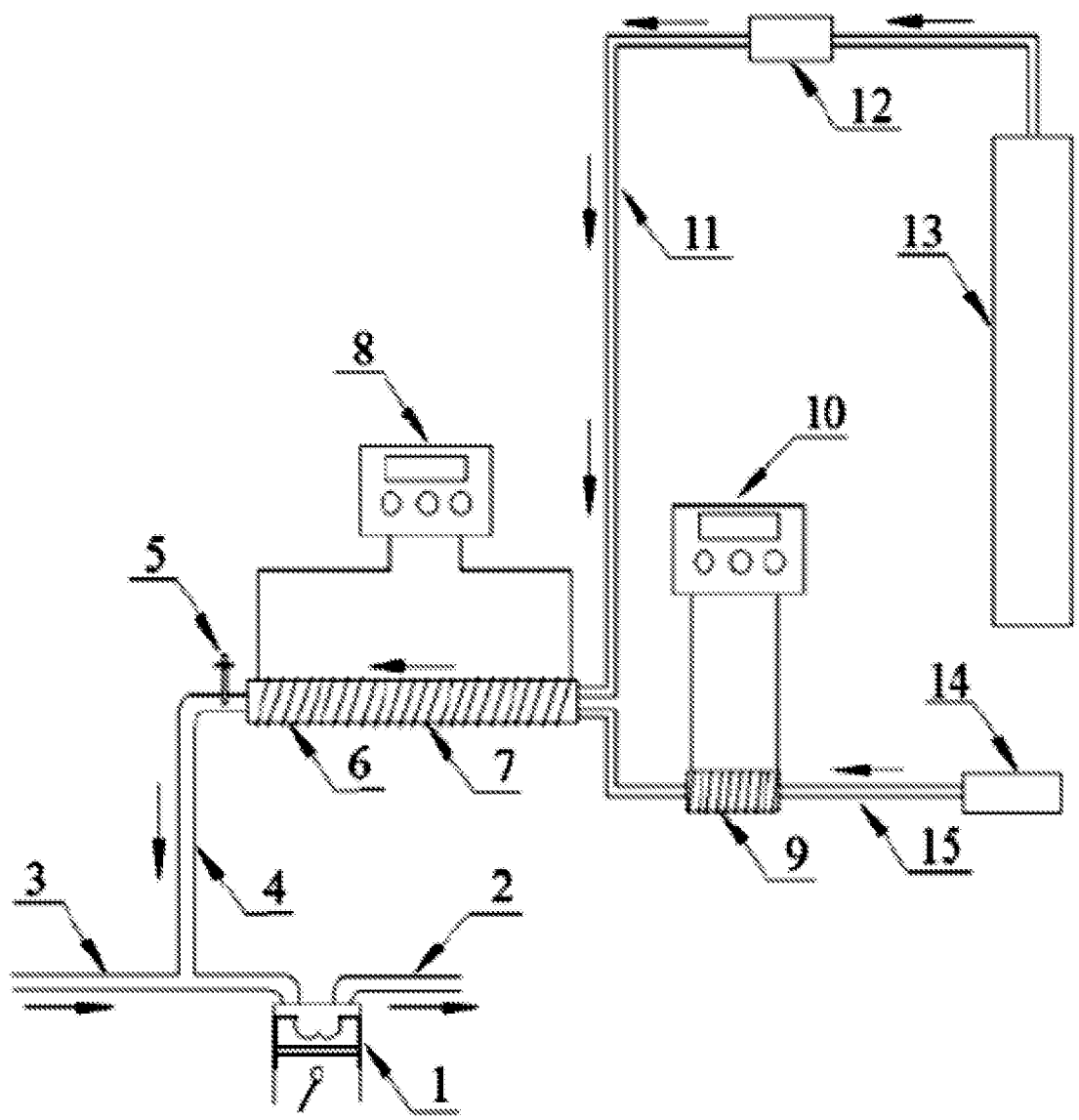

LOW-TEMPERATURE FUEL REFORMING UNIT BASED ON COMBINED EXTERNAL REFORMER OF AN ENGINE

TECHNICAL FIELD

The present invention relates to a novel low-temperature fuel reforming combustion mode and a device incorporated with the same, and in particular to a device system, which uses the low-temperature reforming fuel (T<1000K) in the external fuel reformer, reforms the fuel to low-temperature oxidation products (such as aldehydes, ketones, peroxides) with different activities by regulating boundary conditions of the external reformer such as temperature, pressure and equivalence ratio, and then introduces the hybrid gas with different activities into the engine for combustion according to the actual operating conditions.

BACKGROUND OF THE INVENTION

At present, the internal combustion engines still occupy a dominant position in the transportation field. However, with the diminishing energy and the deteriorating environment in recent years, it is obvious that the traditional combustion mode of internal combustion engine can not meet the requirements of energy and environment. Accordingly, the domestic and foreign experts and scholars have been comprehensively investigated the combustion techniques of the internal combustion engine, and proposed some novel combustion modes, such as homogeneous charge compression ignition (HCCI), low temperature combustion (LTC) and partial premixed combustion (PPC), etc. Reitz et al. of University of Wisconsin discloses a reactivity controlled compression ignition (RCCI) combustion mode based on the controlled activity, which adopts two kind of different activity fuel, such as double fuels of gasoline and diesel, and achieves hybrid gas reactivity control by regulating the ratio of two fuels. Though this technique greatly extends the high-efficiency clean working operation range of the engine, it has a defect of requiring two fuels with two fuel tanks and two fuel systems. Tsolakis et al. of University of Birmingham discloses an on-board reforming unit with catalytic reforming fuel to CO and H2, and introducing the mixture comprising reformed products and fresh fuel into the engine for combustion. This reforming unit improves the exhaust emission and fuel consumption of engine. Yang Wang et al. discloses a novel flexible cylinder engine (short for FCE) combustion strategy, the strategy reforms fuel without catalyst under low temperature condition to be low-temperature products with different activities for improving the combustion state, which has been theoretically proved. Actually, as a new combustion mode, only utilizing one fuel could achieve double-fuel combustion advantages, by introducing the reformed products into engine, e.g., reforming one fuel to the products with different activities and then performing combined combustion by adding fresh fuel to achieve activity and concentration stratification of hybrid gas, thus improving the engine combustion state.

REFERENCES

[1] Yao Mingfa, Zheng Zunqing, Liu Haifeng, *Progress and recent trends in homogeneous charge compression ignition (HCCI) engines*. Progr Energy Combust Sci, 2009. 35: 398-437.

[2] Jung Dongwon, Norimasa Iida, *Closed-loop control of HCCI combustion for DME using external EGR and rebreathed EGR to reduce pressure-rise rate with combustion-phasing retard*. Applied Energy, 2015. 138:315-330.

[3] Laura Manofsky Olesky, George A Lavoie, Dennis N Assanis, et al, *The effects of diluent composition on the rates of HCCI and spark assisted compression ignition combustion*. Applied Energy, 2014. 124:186-198.

[4] Molina S, Garcia A., Pastor J M, et al, *Operating range extension of RCCI combustion concept from low to full load in a heavy-duty engine*. Applied Energy, 2015. 143:211-227.

[5] Zhou D Z, Yang W M, An H, et al, *Application of CFD-chemical kinetics approach in detecting RCCI engine knocking fuelled with biodiesel/methanol*. Applied Energy, 2015. 145:255-264.

[6] Chao Yu, Wang Zhi, Wang Jianxin, *Sequenced combustion characteristics, emission and thermal efficiency in gasoline homogeneous charge induced ignition*. Applied Energy, 2014. 124:343-353.

[7] Donkerbroek A J, Van Vliet A P, Somers L M T, et al, *Relation between hydroxyl and formaldehyde in a direct-injection heavy-duty diesel engine*. Combustion and Flame, 2011. 158(3):564-572.

[8] Al-Qurashi Khalid, Angela D Lueking, Andre L Boehman, *The deconvolution of the thermal, dilution, and chemical effects of exhaust gas recirculation (EGR) on the reactivity of engine and flame soot*. Combustion and Flame, 2011. 158(9):1696-1704.

[9] Yang Binbin, Yao Mingfa, Cheng Wai K, et al, *Experimental and numerical study on different dual-fuel combustion modes fuelled with gasoline and diesel*. Applied Energy, 2014. 113:722-733.

[10] Reitz Rolf D, Ganesh Duraisamy, *Review of high efficiency and clean reactivity controlled compression ignition (RCCI) combustion in internal combustion engines*. Progr Energy Combust Sci, 2015. 46:12-71.

[11] Bogarra M, Herreros J M, Tsolakis A, et al. Study of particulate matter and gaseous emissions in gasoline direct injection engine using on-board exhaust gas fuel reforming. Appl Energy 2016; 180: 245-255.

[12] Wang Y, Wei L X, Yao M F. A theoretical investigation of the effects of the low-temperature reforming products on the combustion of n-heptane in an HCCI engine and a constant volume vessel. Appl Energy 2016; 181: 132-139.

SUMMARY OF THE INVENTION

The present invention discloses a low-temperature fuel reforming unit based on combined external reformer, which connects an external low-temperature fuel reforming unit to an engine, and the low-temperature reforming products in the reforming unit combine with the fresh air and then are introduced into the engine for combustion. Under different operating conditions, engines regulate the low-temperature reforming reaction boundary conditions of the external reformer to reform fuel to become reformed products with different activities, and then mix with the fresh fuel inside the engine cylinder to achieve activity and concentration stratification of hybrid gas inside the cylinder, and to alter reaction path of fuel consumption for extending the high-efficiency clean combustion range. The present invention only adopts a simple oxidation after-treatment device could meet the requirements of Euro VI emission regulations.

For overcoming the above technical problems, the present invention provides a novel low-temperature fuel reforming unit based on combined external reformer of an engine, comprising engine cylinders, an external low-temperature fuel reformer, a air inlet pipe and a fuel sample injection pipe; the engine cylinder connects with the engine inlet pipe and the engine exhaust pipe; the external low-temperature fuel reformer, which is winded with a heater strip, is provide with a first temperature controlled meter; one end of the air inlet pipe and one end of the fuel sample injection pipe are connected with the inlet of the external low-temperature fuel reformer; while the other end of the air inlet pipe is connected with a air bottle; a flow meter is arranged on the air inlet pipe 11; the other end of the fuel sample injection pipe is connected with a fuel injection pump; a fuel vaporization tank, which is provided with a second temperature controlled meter, is arranged on the fuel sample injection pipe; the outlet of the external low-temperature fuel reformer is connected with the engine inlet pipe via reforming gas pipe; a thermocouple is arranged on the reforming gas pipe and adjacent to the outlet of the external low-temperature fuel reformer; the initial fuel from the fuel injection pump enters into the fuel vaporization tank at a constant speed via the fuel sample injection pipe for vaporization, and the vaporized fuel is introduced into the external low-temperature fuel reformer, meanwhile, fresh air provided by the air bottle enters into the external low-temperature fuel reformer via the air inlet pipe, wherein, flow capacity of the fresh air is regulated by the flow meter; in the external low-temperature fuel reformer, vaporized fuel combines with the fresh air, and then performs low-temperature reforming so as to form low-temperature reformed products; and the low-temperature reformed products enter into the engine inlet pipe via reforming gas pipe for mixing with the fresh air again to form a uniform hybrid gas, and the hybrid gas is introduced into the engine cylinder and performing combined combustion with the fuel in the cylinder to achieve activity and concentration stratification of hybrid gas.

Compared with prior art, the advantages of the present invention are as follows: The present invention provides an external low-temperature fuel reforming system without adding catalysts, which performs low-temperature reforming to the fuel in the external fuel reformer according to the actual working condition of the engine, exhausts partial intermediate products or complete oxidation product with different activities by regulating boundary conditions of the reaction between the fuel and air, and then combines the reformed products with the air or the hybrid gas comprising EGR and air to introduce the hybrid gas into the engine for combustion with the fuel in the cylinder to an efficient clean combustion coupling controlled by activity and concentration of the hybrid gas. The present invention performs low-temperature reforming fuel by the external reformer, and the reformed products combine with the fresh air to form a uniform hybrid gas and then introduce into the engine cylinder for combined combustion with the fresh fuel in the working cylinder, thus achieving a controllable oxidation reaction path for the fuel combustion and achieving high-efficiency clean combustion. Under different working conditions, such as engine speed or load, engines regulate the reforming reaction boundary conditions of the external reformer to change the combustion reaction path of the fuel and to obtain reformed hybrid gas with different activities, thus extending the high-efficiency clean combustion range. The present invention only adopts a simple oxidation aftertreatment device could meet the requirements of Euro VI emission regulations.

BRIEF DESCRIPTION OF THE DRAWINGS

FIG. 1 is a structural diagram of the novel low-temperature fuel reforming unit based on combined external reformer of an engine of the present invention;
in which:
1: engine cylinder 2: engine exhaust pipe 3: engine inlet pipe
4: reforming gas pipe 5: thermocouple
6: external low-temperature fuel reformer 7: heater strip
8: first temperature controlled meter 9: fuel vaporization tank
10: second temperature controlled meter 11: air inlet pipe
12: flow meter
13: air bottle 14: fuel injection pump 15: fuel sample injection pipe

DETAILED DESCRIPTION OF THE PRESENT INVENTION

The technical scheme of the present invention will be further described below with reference to the accompanying drawings and embodiments, but the present invention is not limited thereto.

As shown in FIG. 1, the present invention relates to a novel low-temperature fuel reforming unit based on combined external reformer of an engine, comprising an engine main body and an external low-temperature fuel reformer, e.g. comprising an engine cylinder 1, an external low-temperature fuel reformer 6, a air inlet pipe 11 and a fuel sample injection pipe 15.

The engine cylinder 1 connects with the engine inlet pipe 3 and the engine exhaust pipe 2.

One end of the air inlet pipe 11 and one end of the fuel sample injection pipe 15 are connected with the inlet of the external low-temperature fuel reformer 6; while the other end of the air inlet pipe 11 is connected with a air bottle 13; a flow meter 12, which regulates the inlet air capacity of the external low-temperature fuel reformer 6, is arranged on the air inlet pipe 11.

The other end of the fuel sample injection pipe 15 is connected with a fuel injection pump 14 which injects the fuel at a constant speed according to a prescribed reforming equivalence ratio; a fuel vaporization tank 9, which is arranged on the fuel sample injection pipe 15, is used for vaporizing the liquid fuel to be reformed of the fuel sample injection pipe 15 into vapor state under a certain temperature; the fuel vaporization tank 9 is provided with a second temperature controlled meter 10, the heater strip of the fuel vaporization tank 9 controls the heating temperature by the second temperature controlled meter 10, and the heater strip and the thermocouple arranged on the fuel vaporization tank 9 perform closed-loop temperature control.

The external low-temperature fuel reformer 6 is winded with a heater strip 7 and is provided with a first temperature controlled meter 8; the outlet of the external low-temperature fuel reformer 6 is connected with the engine inlet pipe 3 via reforming gas pipe 4; a thermocouple 5, which is used for testing the temperature of the reformed hybrid gas, is arranged adjacent to the outlet of the external low-temperature fuel reformer 6. The first temperature controlled meter 8 regulates the heating power of the heater strip 7 thus the reforming temperature of the external low-temperature fuel reformer 6. The heater strip 7, the first temperature controlled meter 8 and the thermocouple 5 form a closed-loop to control and regulate the fuel reforming temperature, thus achieving fuel low-temperature reforming.

The initial fuel from the fuel injection pump 14 enters into the fuel vaporization tank 9 at a constant speed via the fuel sample injection pipe 15, and the vaporized fuel is introduced into the external low-temperature fuel reformer 6, wherein the flow control is achieved by the fuel injection pump 14; meanwhile, fresh air provided by the air bottle 13 enters into the external low-temperature fuel reformer 6 via the air inlet pipe 11, wherein, flow capacity of the fresh air is regulated by the flow meter 12; In the external low-temperature fuel reformer 6, vaporized fuel combines with the fresh air, and then performs low-temperature reforming so as to form low-temperature products; an injector of the engine cylinder 1 regulates the injection time and injection quantity inside the cylinder, and the reformed low-temperature products enter into the engine inlet pipe 3 via reforming gas pipe 4 for combining with the fresh air again to form a uniform hybrid gas, and the hybrid gas is introduced into the engine cylinder 1 and performing combined combustion with the fuel in the cylinder to achieve activity and concentration stratification of hybrid gas.

By regulating boundary conditions of the external reformer such as temperature, pressure and equivalence ratio, the low-temperature fuel reforming unit of the present invention can achieve the low-temperature oxidation products with different activities, such as reformed PRF90 (the volume ratio of isooctane to n-heptane is 9), can achieve high activity product, such as methane peroxide $CH_3O_2H$, carbonyl peroxide KETs, and can also achieve low activity products, e.g. combustion suppression products, such as methanal $CH_2O$, acetone $CH_3COCH_3$. Therefore, the present invention reforms the hybrid gas inside the engine to an oxidation product with different activities by regulating boundary conditions of the reformer such as temperature, pressure and equivalence ratio, and then introduces the combined hybrid gas and fresh air into the engine for combustion according to the actual working conditions. In fact, introducing the low-temperature reforming products change chemical reaction path of fuel consumption in the engine cylinder, and further affects the combustion work process inside the engine cylinder. The novel low-temperature fuel reforming unit based on combined external reformer of an engine of the present invention achieves low-temperature fuel reforming as well as activity and concentration stratified combustion of hybrid gas inside the engine cylinder, thus improving the engine efficiency and energy saving without adding catalysts.

The working processes of the low-temperature fuel reforming unit under the following working conditions are:

When the low-activity fuel is adopted or when engine is in low-speed and small load working condition, regulating the boundary conditions of the external low-temperature fuel reforming system such as temperature, pressure and equivalence ratio to transform the fuel inside the external low-temperature fuel reformer 6 into a high-activity low-temperature reforming products, and then introducing the low-temperature reforming products into engine cylinder 1 for combining with the fresh fuel inside the engine cylinder, thus achieving concentration and activity stratified combustion of hybrid gas. Due to high-activity radical products have short ignition time which means easy to ignite, the high-activity radical products interacts with the fuel inside the working cylinder so as to improve ignition, thus guarantees the combustion stability under low-speed and small load condition and expands the small load operation range.

When the high-activity fuel is adopted or when engine is in high load/full load working condition, regulating the boundary conditions of the external low-temperature fuel reforming system to transform the fuel inside the external low-temperature fuel reformer 6 into low-activity reforming products (such as aldehyde, acetone, etc.), and then introducing the reforming products into engine cylinder for combustion. Due to hybrid gas after low-temperature reforming has lower activity and long ignition time, the hybrid gas combines with the high-activity fuel inside the working cylinder so as to achieve a high-efficiency clean combustion coupling controlled by activity and concentration of the hybrid gas.

In conclusion, the present invention adopts an external low-temperature reforming system to generate low-temperature reforming products at different oxidation stage according to actual engine working conditions, and the reforming system do not need catalysts. Compared to the other fuel reforming technical schemes, the present invention regulates the reforming oxidation reaction boundary conditions under different working conditions to obtain intermediate products at different reforming oxidation stage, such as peroxide, aldehyde, ketone, CO and H2. The reformed fuel decreases the activity of intermediate products, and the intermediate products at different oxidation stage combine with the fresh air again to form hybrid gas with different chemical activities, and then the hybrid gas performs combustion with the fuel inside the working cylinder, thus a high-efficiency clean combustion controlled by activity and concentration stratification is achieved by adopting single fuel, and the combustion reaction path can be controlled.

Although the functions and working processes of the present invention have been described above with reference to the accompanying drawings, the present invention is not limited thereto. The foregoing specific implementations are merely illustrative but not limiting. A person of ordinary skill in the art may make various forms under the teaching of the present invention without departing from the purpose of the present invention and the protection scope of the appended claims, and all the forms shall fall into the protection scope of the present invention.

What is claimed is:

1. A fuel reforming device, comprising fuel injection pump (14), fuel vaporization tank (9), external low-temperature fuel reformer (6), air bottle (13), flow meter (12) and reforming gas pipe (4), said external low-temperature fuel reformer being winded with a first heater strip, provided with a first temperature controlled meter; having a connection to said air bottle via an air inlet pipe for intake of fresh air and a connection to fuel injection pump via said fuel vaporization tank and fuel sample injection pipe for intake of fuel: and having an outlet connection to an engine inlet pipe via said reforming gas pipe: said fuel vaporization tank (9) being provided with a second heater strip and a thermocouple, arranged on a fuel sample injection pipe, and provided with a second temperature controlled meter, wherein said heater strip on the fuel vaporization tank controls a heating temperature via said second temperature controlled meter, and said heater strip and the thermocouple on the fuel vaporization tank perform a closed-loop temperature control; and said reforming gas pipe being provided with a thermocouple and located adjacent to an outlet of said external low-temperature fuel reformer.

* * * * *